May 14, 1929.  P. F. SHIVERS  1,713,402
VALVE ACTUATOR
Filed Sept. 4, 1926

INVENTOR.
Paul F. Shivers,
BY
Hood + Hahn.
ATTORNEYS

Patented May 14, 1929.

1,713,402

UNITED STATES PATENT OFFICE.

PAUL F. SHIVERS, OF WABASH, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE.

VALVE ACTUATOR.

Application filed September 4, 1926. Serial No. 133,543.

The object of my invention is to provide an efficient mechanical actuator for valves of such character that the valve may be hand manipulated in case of need.

The accompanying drawings illustrate my invention.

Figure 1:
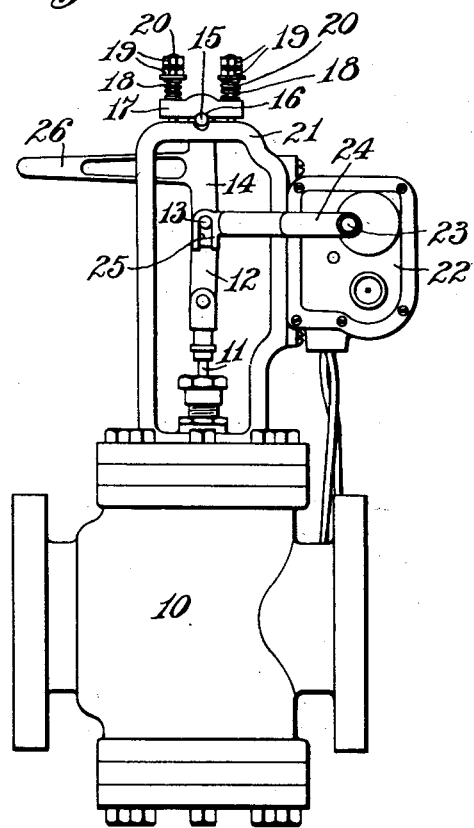
Figure 2:
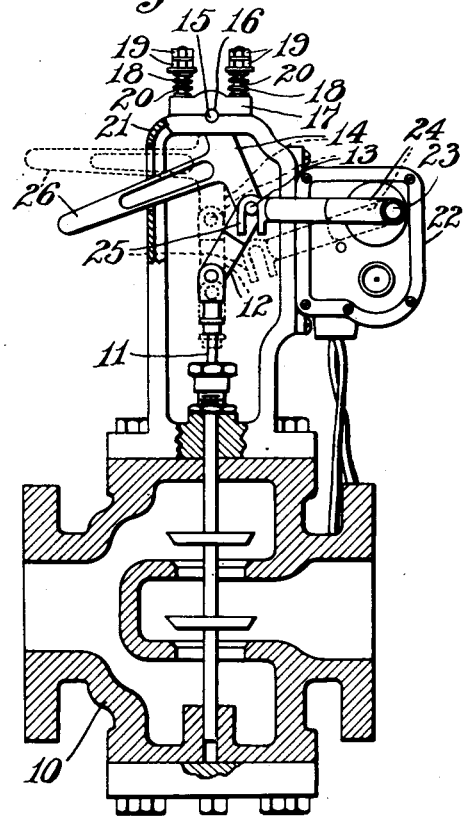

Fig. 1 is a side elevation of my device with the valve in closed position, and Fig. 2 is a similar view with parts in other positions.

In the drawings 10 indicates the main body of a valve the movable element of which is provided with a stem 11. Pivoted to stem 11 is one end of a toggle link 12 which is pivoted by pin 13 to a second toggle link 14 provided at its outer end with a cross pin 15 seated in a seat 16 in an abutment 17 which is yieldingly backed by springs 18 supported by adjusting nuts 19 on pins 20 carried by bracket 21.

Mounted on bracket 21 is an electric motor 22 geared to a wrist pin 23 on which is journaled one end of a pitman 24 provided at its outer end with a fork 25 formed to receive pin 13 and to be readily removable therefrom.

Link 14 is provided with a laterally extended hand lever 26.

In operation, rotation of motor 22 serves to actuate the valve stem through the medium of the toggle 12—14 and the yielding abutment permits the valve to be brought to a positive seat against which it will be yieldingly held by springs 18.

In case of need of hand actuation of the valve, fork 25 is readily detached from pin 13 and the toggle may be actuated by means of hand lever 26.

I claim as my invention:

The combination of a valve casing and reciprocating valve stem, a toggle one end of which is connected to said stem, a yielding abutment for the other end of the toggle, a motor, a pitman connected to said motor and having a readily detachable connection with the toggle, and a hand lever carried by one link of the toggle.

In witness whereof, I have hereunto set my hand at Wabash, Indiana, this 12th day of August, A. D. one thousand nine hundred and twenty-six.

PAUL F. SHIVERS.